(12) United States Patent
Lo

(10) Patent No.: US 10,585,623 B2
(45) Date of Patent: Mar. 10, 2020

(54) SOFTWARE DEFINED FIFO BUFFER FOR MULTITHREADED ACCESS

(71) Applicant: Vivante Corporation, Santa Clara, CA (US)

(72) Inventor: Mankit Lo, Fremont, CA (US)

(73) Assignee: VIVANTE CORPORATION, San Jose, CA (US)

( * ) Notice: Subject to any disclaimer, the term of this patent is extended or adjusted under 35 U.S.C. 154(b) by 327 days.

(21) Appl. No.: 14/966,631

(22) Filed: Dec. 11, 2015

(65) Prior Publication Data
US 2017/0168755 A1 Jun. 15, 2017

(51) Int. Cl.
*G06F 3/06* (2006.01)
*G06F 5/12* (2006.01)

(52) U.S. Cl.
CPC .......... *G06F 3/0659* (2013.01); *G06F 3/0604* (2013.01); *G06F 3/0673* (2013.01); *G06F 5/12* (2013.01)

(58) Field of Classification Search
CPC ..... G06F 3/0659; G06F 3/0604; G06F 4/0673
See application file for complete search history.

(56) References Cited

U.S. PATENT DOCUMENTS

| | | | |
|---|---|---|---|
| 4,779,234 A | 10/1988 | Kaneko | |
| 4,894,797 A | 1/1990 | Walp | |
| 5,581,705 A | 12/1996 | Passint | |
| 5,646,700 A | 7/1997 | Park | |
| 5,978,868 A * | 11/1999 | Maas | G06F 5/10 709/234 |
| 6,044,030 A | 3/2000 | Zheng | |
| 6,115,761 A | 9/2000 | Daniel | |
| 6,956,776 B1 * | 10/2005 | Lowe | G06F 5/14 365/189.05 |
| 7,181,563 B2 | 2/2007 | Andreev | |
| 8,135,915 B2 | 3/2012 | Dimpsey | |
| 2003/0182517 A1 * | 9/2003 | Gooch | G06F 13/1673 711/150 |

(Continued)

OTHER PUBLICATIONS

Webster's New World Telecom Dictionary, "CPU—Computer Definition", Retrieved Jun. 2018 from <http://www.yourdictionary.com/cpu>. (Year: 2010).*

*Primary Examiner* — Ann J Lo
*Assistant Examiner* — Eric T Loonan
(74) *Attorney, Agent, or Firm* — David R. Stevens; Stevens Law Group

(57) ABSTRACT

A computer system includes a hardware buffer controller. Memory access requests to a buffer do not include an address within the buffer and threads accessing the buffer do not access or directly update any pointers to locations within the buffer. The memory access requests are addressed to the hardware buffer controller, which determines an address from its current state and issues a memory access command to that address. The hardware buffer controller updates its state in response to the memory access requests. The hardware buffer controller evaluates its state and outputs events to a thread scheduler in response to overflow or underflow conditions or near-overflow or near-underflow conditions. The thread scheduler may then block threads from issuing memory access requests to the hardware buffer controller. The buffer implemented may be a FIFO or other type of buffer.

20 Claims, 5 Drawing Sheets

(56) References Cited

U.S. PATENT DOCUMENTS

| | | |
|---|---|---|
| 2004/0098519 A1 | 5/2004 | Cheung |
| 2005/0007374 A1 | 1/2005 | Kuo et al. |
| 2007/0143490 A1 | 6/2007 | Gallou |
| 2007/0183241 A1 | 8/2007 | Batra |
| 2008/0005401 A1 | 1/2008 | Holley et al. |
| 2008/0270744 A1 | 10/2008 | Hashimoto |
| 2009/0132979 A1 | 5/2009 | Waters |
| 2013/0198480 A1 | 8/2013 | Jones |
| 2014/0215187 A1 | 7/2014 | Yazdani |
| 2014/0281336 A1* | 9/2014 | Solihin ............... G06F 12/0223 711/170 |
| 2016/0148661 A1* | 5/2016 | Keller ..................... G06F 5/06 365/189.05 |

* cited by examiner

SOFTWARE DEFINED FIFO BUFFER FOR MULTITHREADED ACCESS

BACKGROUND

Field of the Invention

This invention relates to systems and methods for implementing FIFO buffers.

Background of the Invention

In conventional computer systems, a first-in-first-out (FIFO) buffer may be accessed by multiple threads. However, in conventional systems, only one thread at a time may access the FIFO buffer. This introduces delays and processing overhead in order to prevent simultaneous access by blocking threads while waiting for the data structures of the FIFO buffer to be released by another thread.

The systems and methods disclosed herein provide an improved approach for implementing a FIFO buffer that is simultaneously accessible by multiple threads.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
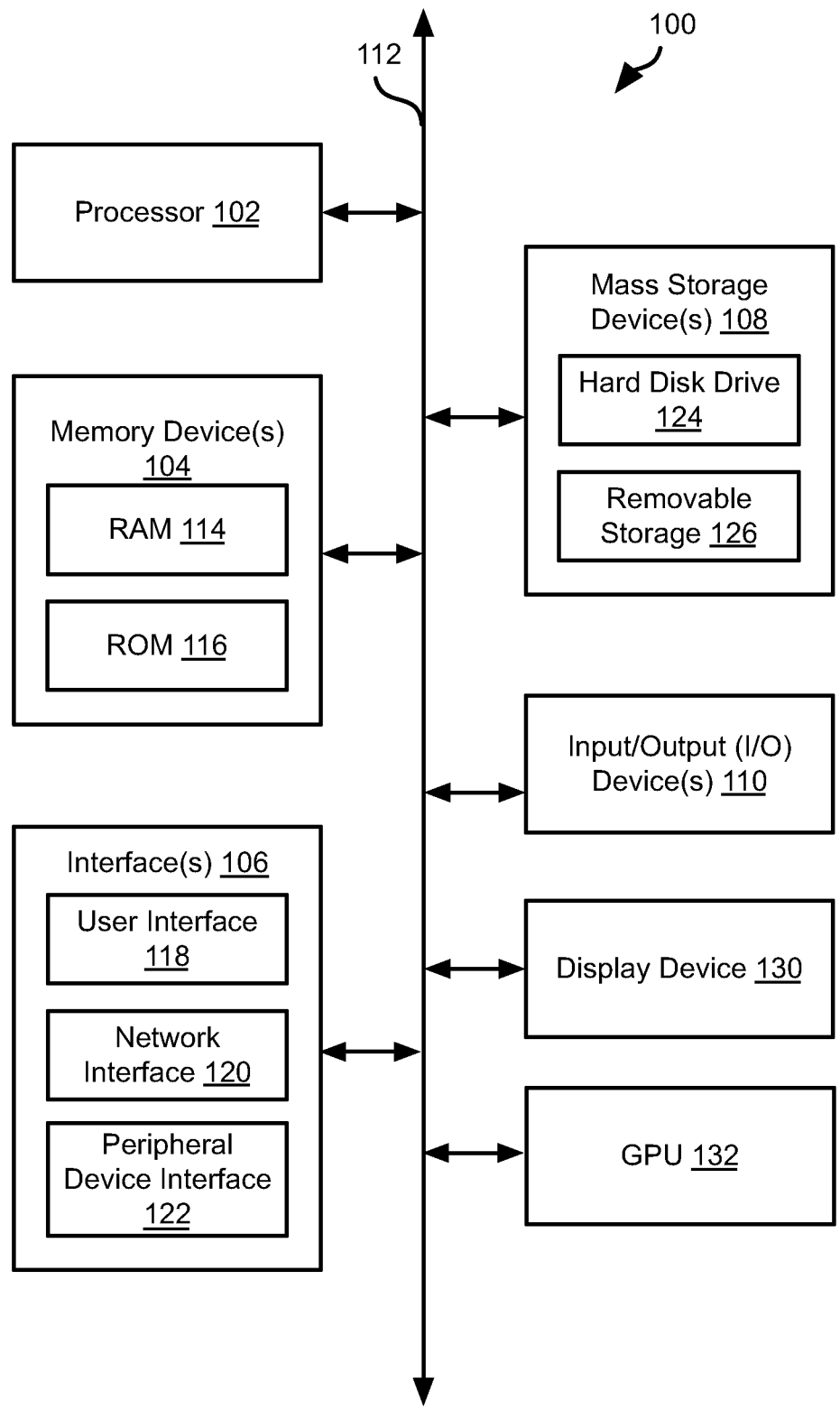
FIG. 1 is a schematic block diagram of a computer system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized, including non-transitory media. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

A graphics-processing unit (GPU) 132 may be coupled to the processor(s) 102 and/or to the display device 130. The GPU may be operable to render computer generated images and perform other graphical processing. The GPU may include some or all of the functionality of a general-purpose processor, such as the processor(s) 102. The GPU may also include additional functionality specific to graphics processing. The GPU may include hard-coded and/or hard-wired graphics function related to coordinate transformation, shading, texturing, rasterization, and other functions helpful in rendering a computer generated image.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2A:
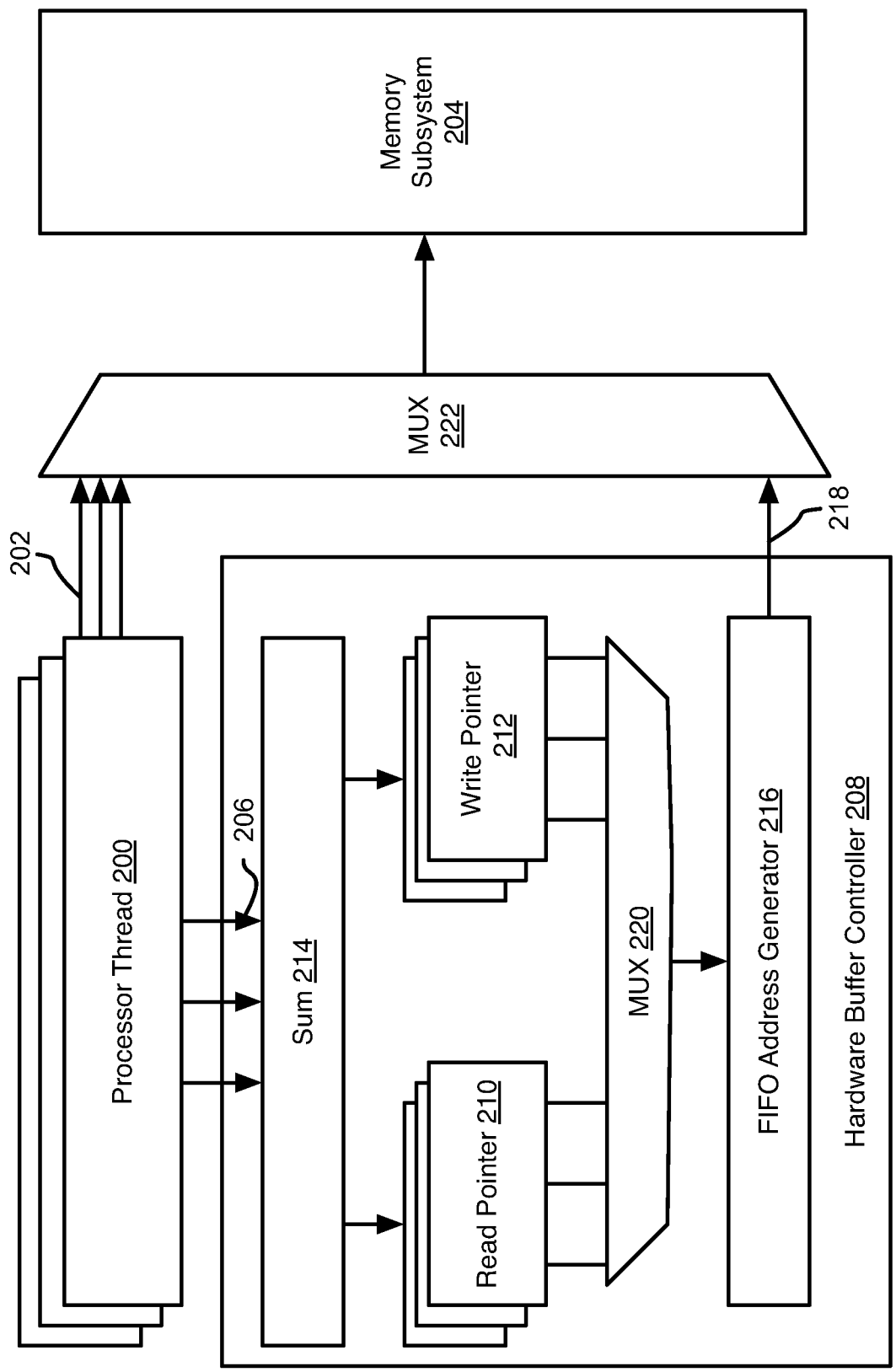
FIGS. 2A to 2B are schematic block diagrams of components for implementing a hardware FIFO buffer in accordance with an embodiment of the present invention.

Referring to FIG. 2A, the processing device 102 may execute one or more threads 200. As noted above, the computer system 100 may include a plurality of processing devices 102. Any one of the processing devices 102 or a combination of the processing devices 102 may perform the functions ascribed hereinbelow to "the processing device" 102. The threads may be instantiated by an application executed by the processing device 102. The processor may distribute processing resources and switch execution from one thread 200 to another in the conventional manner. The threads 200 may issue memory access requests 202 (e.g. read and write requests) to a memory subsystem 204 including the memory devices 104 and possibly a memory controller interposed between the processing device 102 and the memory devices 104. The memory access requests 202 may be any conventional memory access request known in the art, such as instruction including some or all of the following fields <opcode, source type, source address, destination type, destination address>, where opcode is a code indicating the operation to be performed, the source type and destination type indicate which memory device 104 to access, the source address is a location within the memory device 104 from which to retrieve data and the destination address within the memory device 104 to which data is to be written. Likewise, the manner of processing of the memory requests 202 may be conventional. The opcode may be indicate a read operation and therefore be executed to retrieve data from the source address and return to the processor thread 200 that issued the request. Likewise, the opcode may indicate a write operation that is executed to write data to the destination address.

The processor thread 200 may issue memory access requests 206 to a hardware buffer controller 208. The hardware buffer controller 208 is a hardware device including circuits configured to perform the functions ascribed herein to the hardware buffer controller 208. The hardware buffer controller 208 may be located on a different die or the same die as the processing device 102 or the same die as one or more components of the memory subsystem 204. The memory access requests 206 may have the same or a different format than conventional memory access requests 202. However, the memory access requests 206 do not reference directly any address or range of addresses in the memory device 104. Instead, the memory access requests 202 reference a particular hardware buffer controller 208. The hardware buffer controller 208 may be initialized to define one or more buffers, each buffer definition including an allocation of addresses within one of the memory devices 104 that is assigned to the buffer. The allocation may be recorded for each buffer in the form of a start and end address or a start address and a buffer size. The initialization of each hardware buffer controller 208 may include initializing a read pointer 210 to point to an initial read location and initializing a write pointer 212 to point to an initial write location. Multiple buffers may be initialized within the hardware buffer controller 208 or multiple hardware buffer controllers 208 may be initialized in a like manner.

The initialization of the hardware buffer controller 208 for a buffer may be invoked by the processing device 102, which may likewise allocate the memory for the buffer within the memory device 104 according to any method known in the art. The initialization of the buffer may be invoked by an application that instantiated the one or more processing threads 200 and a reference to the initialized buffer may be returned to the application for use by the threads to read and write to the buffer.

In the illustrated embodiment, the hardware buffer controller 208 implements a FIFO buffer. However, other types of buffers (e.g., last-in-first-out) may also be implemented.

The hardware buffer controller 208 may include a summer 214. The summer 214 receives memory access requests 206 and determines a number of requests 206 for each buffer. For example, multiple requests 206 may be received in one clock cycle of the processor 102, a bus 112, or memory subsystem 204. In particular, multiple requests referencing the same buffer may be received. In the illustrated embodiment, the summer 214 sums the number of read requests 206 received for each buffer in each clock cycle and the number of write requests 206 received for each buffer in each clock cycle. Each request 206 may include a buffer identifier such that the summer 214 may all read requests 206 with the same buffer identifier and all the write requests with the same buffer identifier 206.

The read pointer 210 for each buffer is then incremented by the hardware buffer controller 208 by the number of read requests 206 received in the clock cycle referencing the each buffer. Likewise, the write pointer 212 for each buffer is incremented by the hardware buffer controller 208 by the number of write requests 206 received in the clock cycle referencing the each buffer.

A FIFO address generator 216 detects one or both of the output of the summer 214 or the changing of the read pointer 210 or is otherwise notified of any read requests 206 and write requests received for each buffer during a clock cycle. The FIFO address generator 216 then outputs memory access requests 218 to the memory subsystem 204. Specifically, where N read requests are received during a clock cycle, the FIFO address generator 216 either outputs N read requests 218 or a read request 218 including a range of N addresses. Likewise, where N read requests are received during a clock cycle, the FIFO address generator 216 generates N write requests 218 or a write request 218 including N values to be written and a range of N addresses.

The FIFO address generator 216 includes in each request 218 an address based on the state of the read pointer 210. For example, for a single read or write request, the FIFO generator 216 may output a read or write request including the current value (C) of the read or write pointer 210, 212 or the C+1 depending on whether C points to the next available address in the buffer or the previously accessed address in the buffer. For N read or write requests, the FIFO generator 216 outputs N read or write requests including addresses C, C+1, C+2, . . . , C+N−1 or a single read or write request referencing addresses C through C+N−1. In some embodiments, the value of the pointer 210, 212 is incremented prior to determining the address for a request 218. Accordingly, the addresses of the requests 218 would then be C+1, C+2, . . . , C+N or the range C+1 to C+N for a single request 218.

As noted previously, the hardware buffer controller 208 may include multiple buffers. Accordingly, a MUX 220 may selectively couple the pointers 210, 212 to the FIFO address generator 216 which will then generate requests 218 for each buffer in turn in the manner described in the preceding paragraph. Likewise, inasmuch as memory access requests 202 are also being input to the memory subsystem 204, the requests 202, 218 may be input to a MUX 222 which selectively inputs the requests 202, 218 into the memory subsystem 204 according to a round-robin selection scheme or other load-balancing approach.

Figure 2B:
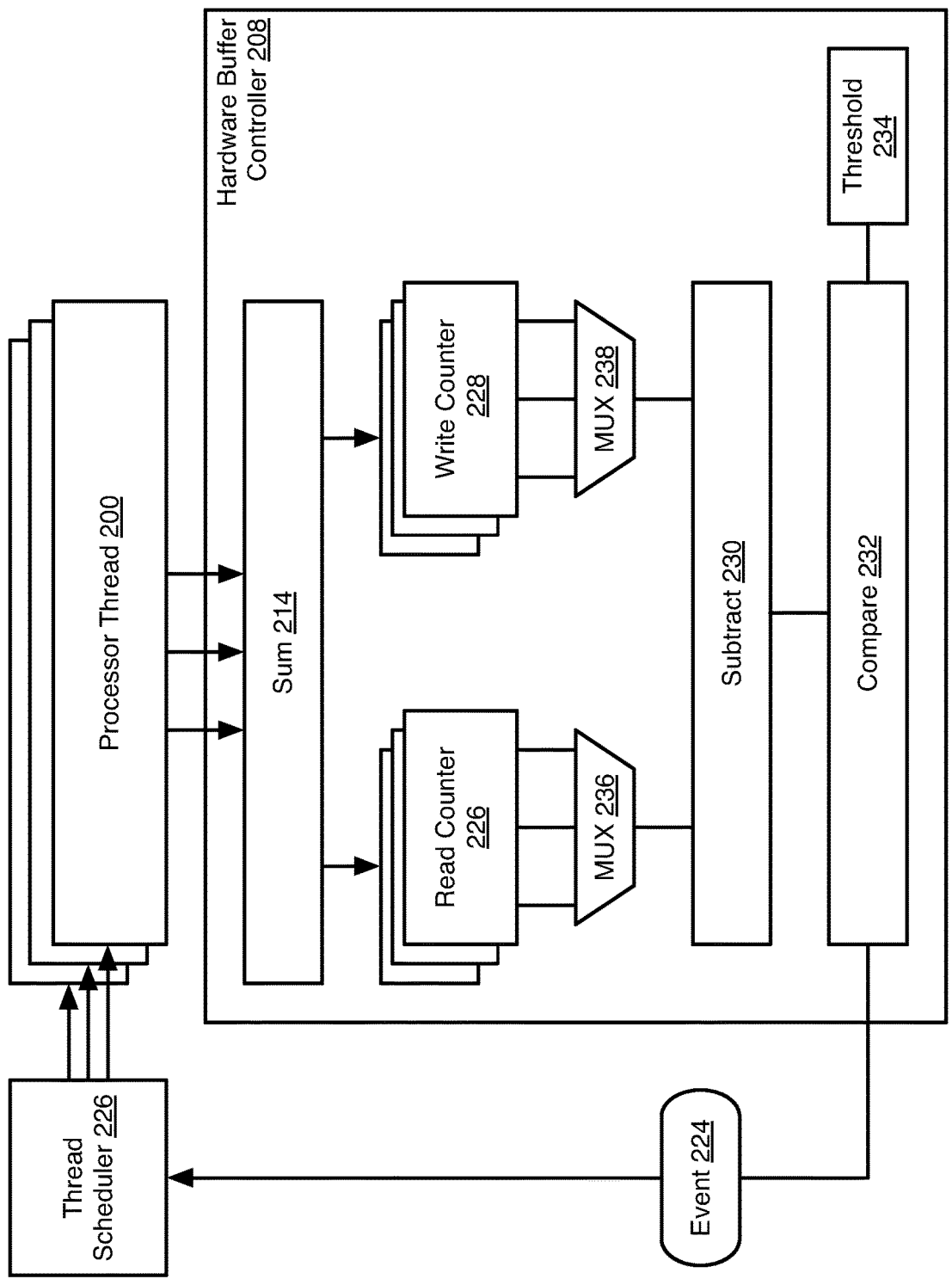

Referring to FIG. 2B, the hardware buffer controller 208 may further generate events 224 based on the state thereof. The events 224 may be input to a thread scheduler 226 executed by the processing device 102. The thread scheduler 226 determines which processor threads 200 to execute on the processing device 102 and also blocks threads, branches to other threads, and performs other thread management functions known in the art. Each event 224 may indicate the buffer for which the event was generated.

In some embodiments, the thread scheduler 226 receives the events 224 and performs thread management tasks thereon. For example, an event 224 may indicate that a buffer is full or almost full. Accordingly, thread 200 may be blocked from writing to the buffer. For example, an application may register one or more threads 200 with the thread scheduler to block in response to the almost full event. Likewise, the scheduler 226 may be programmed to block certain threads from reading from the buffer in response to an event 224 indicating that the buffer is empty or almost empty.

In the illustrated embodiment, events are generated based on a read counter 226 and a write counter 228. For each buffer, the value of the read counter 226 is subtracted from the value of the write counter by a subtractor 230. The difference between the counter 226, 228 values is then input to a comparator 232 as well as one or more threshold values 234.

A zero difference indicates that the buffer is empty—there have been just as many reads as writes. In some embodiments, where the difference is zero, a "buffer empty" event 224 may be generated that identifies the buffer. The threshold 234 may include a low threshold, such that if the references is less than the low threshold, a "near empty" event 224 may generated that references the buffer.

A difference equal to the size of the buffer indicates that the buffer is full since the write operations are greater than read operations by the total number of entries in the buffer. In some embodiments, where the difference is equal to the size of the buffer a "buffer full" event may be generated that references the buffer. The threshold 234 may include a high threshold that is less than the size of the buffer, e.g. equal to between 80 and 90% of the size of the buffer. If the difference is greater than the high threshold, a "near full" event 224 may be generated that references the buffer.

In some embodiments, to avoid overflow of the counters 226, 228 the value of the smaller of the counters 226, 228 may be subtracted from the counters 226, 228, e.g. periodically or upon one of the counters 226, 228 approaching the maximum value that is representable by the counters 226, 228.

In some embodiments, the comparator 232 may generate events when an empty, near empty, full, or near full condition ceases to exist. For example, if a buffer was previously found to be full or near full and is subsequently found not to be full or near full a "buffer ready" or "buffer full cleared" event may be generated by the comparator 232. Likewise, if a buffer was previously found to be empty or near empty and is subsequently found not to be empty or near empty, a "buffer ready" or "buffer empty cleared" event may be generated by the comparator 232.

As noted above, the hardware buffer controller 208 may implement multiple buffers. Accordingly, in such embodiments multiplexers 236, 238 may selectively coupled the counters 226, 228 for each buffer to the subtractor 230 and comparator 232 in order to evaluate the difference between them and generate events for each buffer as needed according to the approach described above.

Upon receiving an event 224 the thread scheduler 224 may then invoke one or more actions with respect to the processor threads 200. For example, an application may instruct the scheduler 226 to block a thread 200 upon receiving a "buffer empty" or "near empty" event. Accordingly, upon receiving such an event, that thread 200 will then be blocked from executing. The thread may be blocked by the thread scheduler 224 until the "buffer empty" or "buffer empty" event is cleared such as upon receiving a "buffer ready" or "buffer empty cleared" event.

For Similarly, an application may instruct the scheduler 226 to block a thread 200 upon receiving a "buffer full" or "near full" event. Accordingly, upon receiving such an event, that thread 200 will then be blocked from executing. The thread may be blocked by the thread scheduler 224 until the "buffer full" or "near full" event is cleared such as upon receiving a "buffer ready" or "buffer empty cleared" event.

An application may therefore have some threads 200 programmed to perform write requests to a buffers and may instruct the thread scheduler 226 to block such threads 200 upon receiving a "buffer full" or "near full" event referencing the buffer. The application may have one or more different threads 200 that are programmed to perform read requests to the buffer and may instruct the thread scheduler 226 to block such threads 200 upon receiving a "buffer empty" or "near empty" event for that buffer.

A thread 200 may issue requests for more than one buffer and the application may therefore instruct the thread schedule 226 to block the thread based on events referencing one or more buffers implemented by the hardware buffer controller 208.

Figure 3A:
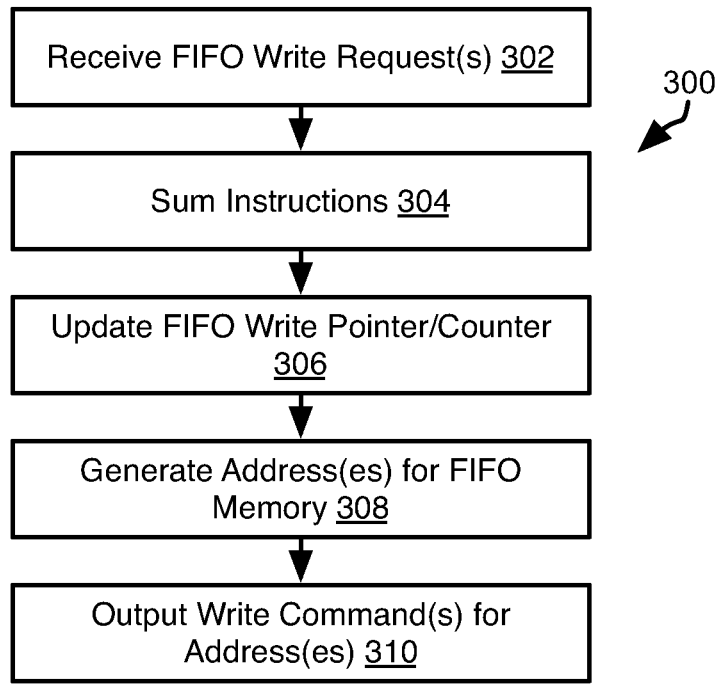
FIGS. 3A and 3B are process flow diagrams of method for implementing reading and writing to a hardware FIFO buffer in accordance with an embodiment of the present invention.

Referring to FIG. 3A, the illustrated method 300 may be executed by the hardware buffer controller 208 in response to receiving a write request referencing a buffer, the write request including an identifier of the buffer but not including an address in a memory device 104 where the entries of the buffer are actually stored.

The method 300 includes receiving 302 one or more write requests for a buffer and summing 304 the write requests to determine the number of write requests received for the buffer during a time period. For example, the number of write requests received during one clock cycle of the processing device 102, bus 112, memory device 104, or the hardware buffer 208 may be counted at step 304. As noted above, multiple buffers may be implemented by the hardware buffer controller 208 such that the steps of the method 300 are performed for each buffer for which a write request was received during a clock cycle. For purposes of FIGS. 3A and 3B, "the buffer" refers to the buffer for which the illustrated method is being performed.

The method 300 may include updating 306 one or both of the write pointer 212 and write counter 228. In some embodiments, only one of these values is used to represent the state of the buffer. For example, the hardware buffer controller 208 may store only a write pointer 212 and read pointer 210 to determine the state of the buffer rather than counters. In others, only counters 226, 228 are used and an address is determined from the counters and a start address of the buffer. In particular, updating the pointer 212 and counter 228 may include incrementing each of them by the number of write requests received during the clock cycle.

The method 300 further includes generating 308 addresses based on the state of the write pointer 212 and the number of write requests received 302. As noted above, where the current value of the pointer is C prior to receiving 302 the write requests and updating 306 the write pointer 212 and N write requests were received, then the addresses generated may then be C, C+1, . . . C+N−1, where C points to the next address to write to. Where C points to the most recently written address, then the addresses generated then be C+1, C+2, . . . C+N. The addresses may be generated in the form of a range, e.g. a data pair <C, N−1>or <C+1,N>, where one value is the start address and the other value is an offset from the start address.

The method 300 may further include outputting 310 to the memory subsystem 204 one or more write commands including the addresses generated at step 308, the write commands effective to invoke writing of data from the write requests at the addresses in the one or more write commands in one of the memory devices 104. As noted above, N write commands may be output 310 for each write request received 302 and each including one of the addresses generated at step 308. Alternatively, a single write command may be output 310 that specifies all N addresses generated at step 308 or a range of addresses (e.g., start address and offset) spanning all N addresses. The write commands are then executed by the memory device 104 to which they are addressed and the method ends.

Figure 3B:
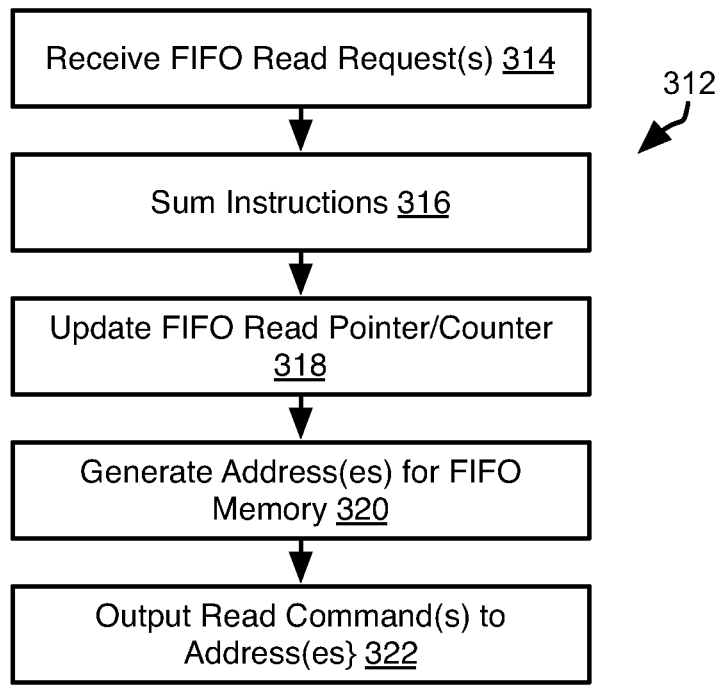

Referring to FIG. 3B, the illustrated method 312 may be executed by the hardware buffer controller 208 in response to receiving a read request referencing a buffer, the read request including an identifier of the buffer but not including an address in a memory device 104 where the entries of the buffer are actually stored.

The method 312 includes receiving 314 one or more read requests for a buffer and summing 316 the read requests to determine the number of read requests received for the buffer during a time period. For example, the number of read requests received during one clock cycle of the processing device 102, bus 112, memory device 104, or the hardware buffer 208 may be counted at step 316. As noted above, multiple buffers may be implemented by the hardware buffer controller 208 such that the steps of the method 312 are performed for each buffer for which a write request was received during a clock cycle.

The method 312 may include updating 318 one or both of the read pointer 210 and read counter 226. In some embodiments, only one of these values is used to represent the state of the buffer. For example, the hardware buffer controller 208 may store only a write pointer 212 and read pointer 210 to determine the state of the buffer rather than counters. In others, only counters 226, 228 are used and an address is determined from the counters and a start address of the buffer. Updating 318 the pointer 210 and counter 226 may include incrementing each of them by the number of write requests received during the clock cycle.

The method 312 further includes generating 320 addresses based on the state of the read pointer 210 and the number of read requests received 314. As noted above, where the current value of the pointer is C prior to receiving 314 the read requests and updating 318 the read pointer 210 and N read requests were received, then the addresses generated may then be C, C+1, . . . C+N−1, where C points to the next address to write to. Where C points to the most recently read address, then the addresses generated then be C+1, C+2, . . . C+N. The addresses may be generated in the form of a range, e.g. a data pair <C, N−1> or <C+1,N>, where one value is the start address and the other value is an offset from the start address.

The method 312 may further include outputting 322 to the memory subsystem 204 one or more read commands including the addresses generated at step 308, the read commands effective to invoke retrieval of data at the addresses in the one or more write commands from one of the memory devices 104 and return this data to the processing device 102. As noted above, N read commands may be output 322 for each read request received 302 and each including one of the addresses generated at step 308. Alternatively, a single read command may be output 322 that specifies all N addresses generated at step 308 or a range of addresses (e.g., start address and offset) spanning all N addresses. The read commands are then executed by the memory device 104 to which they are addressed and the method ends.

The methods 300 and 312 may be executed substantially simultaneously. For example, separate read and write pipelines may be implemented by the hardware buffer controller 208 such memory access commands can be simultaneously generated for both read and write requests. The memory access commands from steps 310 and 322 may be buffered and executed sequentially by the memory subsystem 204 according to any command execution scheme known in the art.

Figure 4:
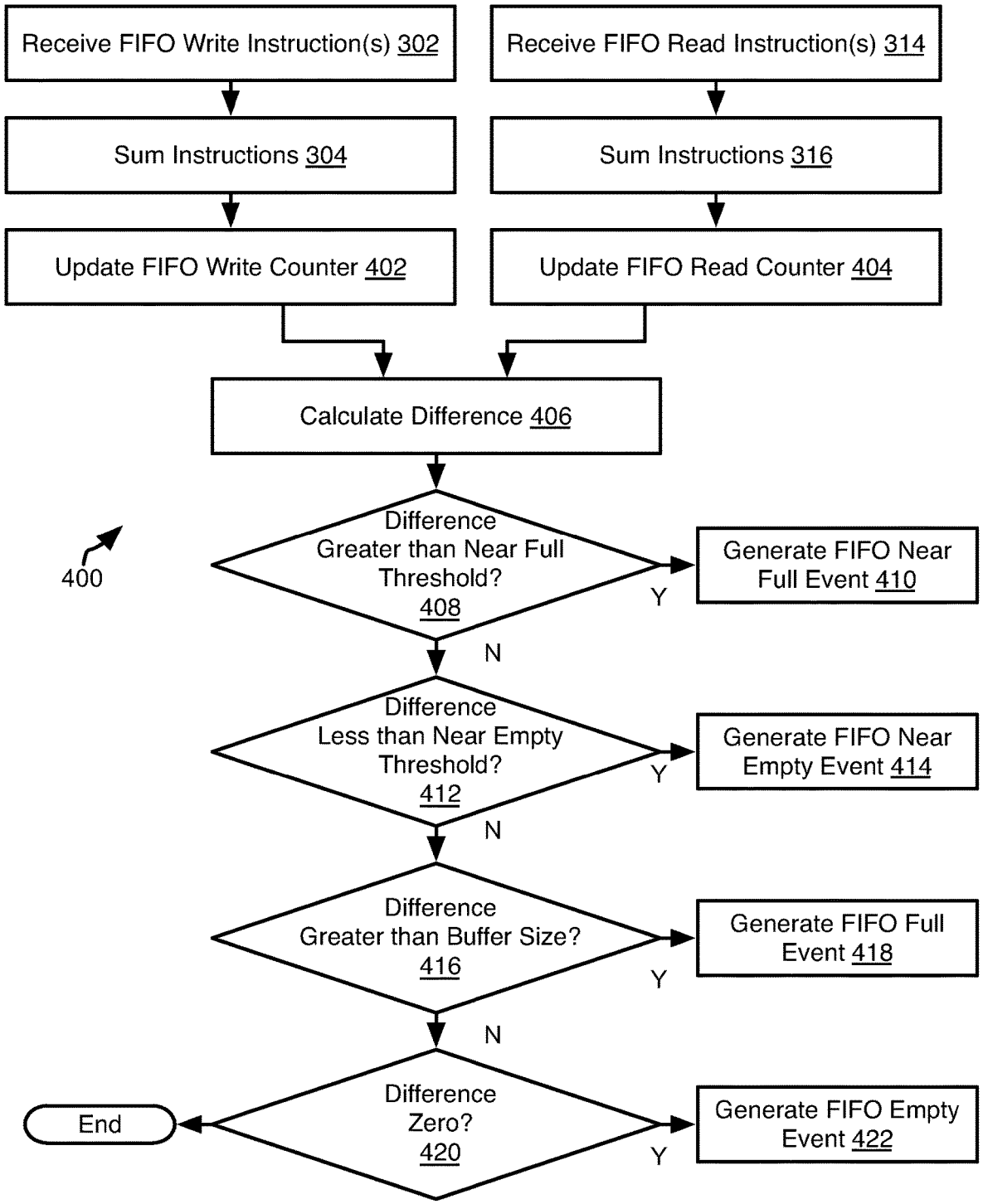
FIG. 4 is a process flow diagram of a method for preventing buffer overflow and underflow using a hardware FIFO buffer in accordance with an embodiment of the present invention.

Referring to FIG. 4, the illustrated method 400 may be executed by the hardware buffer controller 208 in order to detect full, near full, empty, and near empty conditions of a buffer. The method 400 may be executed for each buffer controlled by the hardware buffer controller 208, hereinafter "the buffer."

The method 400 may include or be preceded by the steps of receiving 302 write instructions during the clock cycle and summing 304 the write instructions received during the clock cycle as described above with respect to FIG. 3A. The summing step 304 may be executed once for both the method 300 and the method 400 or may be performed separately for each method.

The method 400 may also include or be preceded by the steps of receiving 314 write instructions during the clock cycle and summing 316 the write instructions received during the clock cycle as described above with respect to FIG. 3B. The summing step 316 may be executed once for both the method 312 and the method 400 or may be performed separately for each method.

The method 400 may further include updating 402 the write counter 238 and updating 404 the read counter 236. As described above, this may include adding the number of write requests received during the clock cycle to the write counter 238 and adding the number of read request received during the clock cycle to the read counter 236.

The method 400 may further include calculating 406 a difference between the write counter and the read counter. In the absence of an underflow condition where reads exceed writes, the difference between the write counter and read counter will be positive or zero. In some embodiments, to avoid exceeding the largest number processable by the circuit implementing the difference function of step 406 and the registers storing the counters 236, 238, the write counter may be set equal to the value of the difference and the read pointer may be set equal to zero for each iteration of the method 400.

The method 400 may include evaluating the difference calculated at step 406 with respect to one or more thresholds. For example, if the difference is found 408 to be greater than a near full threshold, then a near full event may be generated 410. If the difference if found 412 to be less than a near empty threshold, then a near empty event may be generated 414. If the difference is found 416 to be greater than the size of a buffer, then a buffer full event may be generated 418. If the difference is found 420 to be zero, then a buffer empty event may be generated. The thresholds of steps 408-420 may be evaluated in any order or simultaneously using parallel pipelines.

The near full and near empty thresholds may be predetermined values that are hardwired or programmed prior to execution of the method 400. In some embodiments, the near full and near empty thresholds may be a function of the number of threads executing and the delay between when a near full or near empty condition is found to exist and the threads may be blocked in response to the event. For example, where M threads are executing that are programmed to issue write requests and it takes at least Q clock cycles to block the threads in response to an event, then the near full threshold may be set equal to S−Q*M−R, where S is the size of the buffer and R is a value greater than zero in order to guarantee that overflow does not occur. In this manner, if a near full condition is detected, buffer overflow will not occur before the near full event causes blocking of the M threads that may issue write requests.

In a like manner, where M threads are executing that are programmed to issue read requests, then the near empty threshold may be set equal to Q*M+R, where S is the size of the buffer and R is a value greater than zero in order to guarantee that underflow does not occur. In this manner, if a near empty condition is detected, buffer underflow will not occur before the near empty event causes blocking of the M threads that may issue read requests.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising:
providing a memory device storing executable data;
providing a processing device coupled to the memory device and operable to retrieve and execute the executable data;
receiving, by the processing device, from a thread of an application, a buffer initialization instruction;
in response to the buffer initialization instruction:
(a) allocating, by the processing device, a portion of the memory device as a buffer;
initiating, by the processing device, a state of a hardware buffer controller to reference the portion of the memory device that was allocated at (a) in response to the buffer initialization instruction; and returning, by the processing device, to the thread of the application, a reference to the hardware buffer controller such that memory access using the reference to the hardware buffer does not include any reference to any address in the memory device;

executing, by the processing device, the application, the executing the application including executing requests to access the hardware buffer controller from the thread of the application, the requests being addressed only to the reference to the hardware buffer controller and not including any address within the portion of the memory device;

in response to the requests, inputting, by the processing device, the requests to the hardware buffer controller;

processing, by the hardware buffer controller, the requests by, for each request:
generating an address within the portion of the memory device based on the state of the hardware buffer controller;
outputting, to the memory device, a memory access instruction including the address; and
updating the state of the hardware buffer controller.

2. The method of claim 1, wherein the hardware buffer controller implements a first-in-first-out (FIFO) buffer.

3. The method of claim 2, wherein the state of the hardware buffer controller includes a read pointer and a write pointer;
wherein updating the state of the hardware buffer controller comprises, for each write request of the requests, incrementing the write pointer;
wherein updating the state of the hardware buffer controller comprises, for each read request of the requests, incrementing the read pointer.

4. The method of claim 3, wherein incrementing the write pointer comprises determining a number of a plurality of write requests received during a clock cycle and incrementing the write pointer by the number of the plurality of write requests; and
wherein incrementing the read pointer comprises determining a number of a plurality of read requests received during the clock cycle and incrementing the read pointer by the number of the plurality of read requests.

5. The method of claim 3, wherein generating the address within the buffer based on the state of the hardware buffer controller comprises, for each write request of the requests, outputting a current value of the write pointer;
wherein generating the address within the buffer based on the state of the hardware buffer comprises, for each read request of the requests, outputting a current value of the read pointer.

6. The method of claim 5, further comprising:
calculating, by the processing device, a difference between a quantity of the write requests and a quantity of the read requests;
determining, by the processing device, that the difference is less than a first threshold and non-zero;
in response to determining that the difference is less than a first threshold and non-zero, outputting, by the processing device, an event indicating that the buffer is near empty;
in response to the event indicating that the buffer is near empty, blocking, by the processing device one or more threads of execution executed by the processing device from generating read requests.

7. The method of claim 5, further comprising:
calculating, by the hardware buffer controller, a difference between a quantity of the write requests and a quantity of the read requests;
determining, by the hardware buffer controller, that the difference is greater than a first threshold;
in response to determining that the difference is greater than a first threshold, outputting, by the hardware buffer controller, an event indicating that the buffer is near full;
in response to the event indicating that the buffer is near full, blocking, by the processing device, one or more threads of execution executed by the processing device from generating write requests.

8. The method of claim 1, wherein processing the requests by the hardware buffer controller further comprises:
aggregating multiple write requests of the requests;
transmitting an aggregate write instruction to the memory device including multiple addresses within the buffer corresponding to the multiple write requests;
aggregating multiple read requests of the requests; and
transmitting an aggregate read instruction to the memory device including multiple addresses within the buffer corresponding to the multiple read requests.

9. The method of claim 8, wherein the multiple write requests are issued by a plurality of threads of execution in an overlapping manner such that at least one write request of the write requests is received prior to input of other requests of the requests to the hardware buffer controller.

10. The method of claim 9, further comprising:
evaluating, by the processing device, the state of the hardware buffer controller;
determining, by the processing device that the state of the hardware buffer controller meets a threshold condition;
in response to determining that the state of the hardware buffer controller meets the threshold condition, blocking, by the processing device, the plurality of threads of execution from issuing additional requests referencing the hardware buffer controller.

11. A system comprising:
a memory device for storing executable data;
a processing device; and
a plurality of hardware buffer controllers operably coupled to the processing device;
wherein the processing device is coupled to the memory device and operable to retrieve and execute the executable data, the processing device programmed to receive a buffer request from a thread of an application executed by the processing device and, in response to the buffer request:
(a) allocate a portion of the memory device to the buffer request;
initiate a state of a particular hardware buffer controller of the plurality of hardware buffer controllers to reference the portion of the memory device allocated at (a); and
return, to the thread of the application, a reference to the particular hardware buffer controller, the reference being such that memory access using the reference does not include any reference to any address in the memory device;
wherein each hardware buffer controller of the plurality of hardware buffer controllers is coupled to the processing device and the memory device, each hardware buffer controller being programmed to:
receive memory access requests from the application executed by the processing device that do not include any address for any storage location in the memory device and are addressed only to a reference to the each hardware buffer controller;
generate a generated address within the portion of memory based on a state of the each hardware buffer controller;
output, to the memory device, a memory access instruction including the generated address; and
update the state of the each hardware buffer controller.

12. The system of claim 11, wherein the state of the each hardware buffer controller implements a first-in-first-out (FIFO) buffer.

13. The system of claim 12, wherein each hardware buffer controller is further programmed to:
update the state of the each hardware buffer controller by, for each write request of the requests, incrementing a write pointer;
wherein updating the state of the each hardware buffer controller comprises, for each read request of the requests, incrementing a read pointer.

14. The system of claim 13, wherein each hardware buffer controller is further programmed to increment the write pointer by determining a number of a plurality of write requests received during a clock cycle and incrementing the write pointer by the number of the plurality of write requests; and
wherein each hardware buffer controller is further programmed to increment the read pointer by determining a number of a plurality of read requests received during the clock cycle and incrementing the read pointer by the number of the plurality of read requests.

15. The system of claim 13, wherein each hardware buffer controller is further programmed to generate the generated address within the area of the memory device allocated to the buffer based on the state of the each hardware buffer controller by, for each write request of the requests, outputting a current value of the write pointer;
wherein each hardware buffer controller is further programmed to generate the generated address within the area of the memory device allocated to the each hardware buffer controller based on the state of the each hardware buffer controller by, for each read request of the requests, outputting a current value of the read pointer.

16. The system of claim 15, wherein each hardware buffer controller is further programmed to:
calculate a difference between a quantity of the write requests and a quantity of the read requests; and
if the difference is less than a first threshold and non-zero, output an event indicating that the each hardware buffer controller is near empty; and
wherein the processing device is further programmed to, in response to the event indicating that the each hardware buffer controller is near empty, block one or more threads of execution executed by the processing device from generating read requests.

17. The method of claim 16, wherein each hardware buffer controller is further programmed to:
calculate a difference between a quantity of the write requests and a quantity of the read requests; and
if the difference is greater than a second threshold, outputting, by the processing device, an event indicating that the each hardware buffer controller is near full; and
wherein the processing device is further programmed to, in response to the event indicating that the each hardware buffer controller is near full, block one or more threads of execution executed by the processing device from generating write requests.

18. The system of claim 11, wherein each hardware buffer controller is further programmed to process the requests by:
aggregating multiple write requests of the requests;
transmitting an aggregate write instruction to the memory device including multiple addresses within the buffer corresponding to the multiple write requests;
aggregating multiple read requests of the requests; and
transmitting an aggregate read instruction to the memory device including multiple addresses within the each hardware buffer controller corresponding to the multiple read requests.

19. The system of claim 18, wherein each hardware buffer component is programmed to receive the multiple write requests from a plurality of threads of execution executed by the processing device in an overlapping manner such that at least one write request of the write requests is received prior to input of other requests of the requests to the each hardware buffer controller.

20. The system of claim 19, wherein each hardware buffer controller is further programmed to:
evaluate the state of the each hardware buffer controller;
if the state of the each hardware buffer controller meets a threshold condition, invoking blocking, by the processing device, the plurality of threads of execution from issuing additional requests referencing the hardware buffer controller.

* * * * *